US012538996B2

(12) United States Patent
Johnson et al.

(10) Patent No.: US 12,538,996 B2
(45) Date of Patent: Feb. 3, 2026

(54) COOKTOP APPLIANCE AUTOMATED RICE COOKING

(71) Applicant: Haier US Appliance Solutions, Inc., Wilmington, DE (US)

(72) Inventors: Eric Scott Johnson, Louisville, KY (US); Omar Santana, Louisville, KY (US); Eugenio Gomez, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 833 days.

(21) Appl. No.: 17/860,290

(22) Filed: Jul. 8, 2022

(65) Prior Publication Data

US 2024/0008673 A1 Jan. 11, 2024

(51) Int. Cl.
*A47J 27/62* (2006.01)
*A47J 27/00* (2006.01)

(52) U.S. Cl.
CPC ............. *A47J 27/62* (2013.01); *A47J 27/004* (2013.01); *A47J 2202/00* (2013.01)

(58) Field of Classification Search
CPC ...... A47J 27/62; A47J 27/004; A47J 2202/00; A47J 36/165; A47J 43/046; A47J 27/002; A47J 43/044; A47J 43/082; A47J 27/00; A47J 43/0727; A47J 2043/04454; A47J 27/14; A47J 36/06; A47J 36/2483; A47J 36/26; A47J 36/32; A47J 36/34; A47J 37/047; A47J 43/042; A47J 43/06; A47J 43/0716; A47J 43/087; A47J 44/00; A47J 2043/04463; A47J 31/60; A47J 36/321; A47J 37/10; A47J 37/05; A47J 43/04; A47J 43/0766; A47J 43/0772; A47J 43/0777; A47J 43/00; A47J 43/085; A47J 36/00;

(Continued)

(56) References Cited

U.S. PATENT DOCUMENTS 2,952,764 A 9/1960 Yoshitada
3,177,319 A 4/1965 Tatsuro
(Continued)

FOREIGN PATENT DOCUMENTS

CN 109709160 A 5/2019
CN 209295209 U 8/2019
(Continued)

*Primary Examiner* — Phuong T Nguyen
(74) *Attorney, Agent, or Firm* — Dority & Manning, P.A.

(57) ABSTRACT

A method of operating a cooktop appliance includes receiving a rice cooking mode initiation signal. The method also includes operating a heating element to provide a first target temperature at a utensil during a preheat stage and measuring the temperature at the utensil during the preheat stage. The method further includes exiting the preheat stage when the measured temperature at the utensil reaches a temperature threshold. The method also includes operating the heating element to provide a second target temperature at the utensil during a simmer stage after the preheat stage. The second target temperature is different from the first target temperature. The method further includes operating the heating element to provide a third target temperature at the utensil during a sensing stage after the simmer stage and providing a user notification that the rice cooking mode is complete.

20 Claims, 5 Drawing Sheets

(58) Field of Classification Search
CPC .. A47J 2027/043; A47J 43/0722; A47J 42/04;
A47J 42/46; A47J 42/14; A47J 42/40;
A47J 42/00; A47J 42/50; A47F 1/035
USPC ......... 99/325, 326, 331, 337, 338, 342, 352,
99/357, 427, 523, 468, 486, 280, 356,
99/390, 494, 516, 492, 509–511
See application file for complete search history.

(56) References Cited

U.S. PATENT DOCUMENTS

| | | |
|---|---|---|
| 3,551,644 A | 12/1970 | Sano et al. |
| 3,598,614 A | 8/1971 | Hsu |
| 4,315,138 A | 2/1982 | Miwa |
| 5,744,783 A * | 4/1998 | You .................... A47J 27/62 |
| | | 219/710 |
| 5,746,114 A | 5/1998 | Harris |
| 5,981,916 A | 11/1999 | Griffiths et al. |
| 8,252,355 B2 | 8/2012 | Mizuno et al. |
| 2020/0178357 A1 | 6/2020 | Christiansen et al. |
| 2020/0352383 A1 | 11/2020 | Kuroyanagi et al. |
| 2021/0010677 A1 | 1/2021 | Johnson et al. |

FOREIGN PATENT DOCUMENTS

| | | |
|---|---|---|
| ES | 1272019 U | 6/2021 |
| JP | 2005207695 A | 8/2005 |
| KR | 102105926 B1 | 4/2020 |

* cited by examiner

COOKTOP APPLIANCE AUTOMATED RICE COOKING

FIELD OF THE INVENTION

The present subject matter relates generally to cooktop appliances, including cooktop appliances configured for precise temperature control.

BACKGROUND OF THE INVENTION

Cooktop appliances generally include heating elements for heating cooking utensils, such as pots, pans and griddles. A user can select a desired heating level, and operation of one or more of the heating elements is modified to match the desired heating level. For example, certain cooktop appliances include electric heating elements. During operation, the cooktop appliance operates the electric heating elements at a predetermined power output corresponding to a selected heating level. As another example, some cooktop appliances include gas burners as heating elements. During operation, the heat output of the gas burner is modulated by adjusting a position of a control valve coupled to the gas burner.

Some cooktop appliances are operable in a precision mode, which generally uses a closed-loop control algorithm to vary the output of the heating element in response to the desired heating level and a measured temperature, e.g., of or at the cooking utensil. Typical closed-loop control algorithms are generally based on certain assumptions which are suitable for most, but not all, cooking tasks. In cases were these assumptions are not applicable, such as rice cooking, the typical closed-loop algorithm may not produce the desired results.

Accordingly, a cooktop appliance with features for improved precision temperature control, e.g., that is specifically attuned for automatic rice cooking, would be useful.

BRIEF DESCRIPTION OF THE INVENTION

Aspects and advantages of the invention will be set forth in part in the following description, or may be apparent from the description, or may be learned through practice of the invention.

In one example embodiment, a cooktop appliance includes a user interface. The cooktop appliance also includes a heating element positioned at a cooking surface of the cooktop appliance and a temperature sensor configured to measure a temperature at a utensil heated by the heating element. The cooktop appliance further includes a controller. The controller is configured for receiving a rice cooking mode initiation signal. The controller is also configured for operating the heating element to provide a first target temperature at the utensil during a preheat stage and measuring the temperature at the utensil heated by the heating element during the preheat stage. The controller is further configured for exiting the preheat stage when the measured temperature at the utensil reaches a temperature threshold. The controller is also configured for operating the heating element to provide a second target temperature at the utensil during a simmer stage after the preheat stage. The second target temperature is less than the first target temperature. The controller is further configured for operating the heating element to provide a third target temperature at the utensil during a sensing stage after the simmer stage and providing a user notification that the rice cooking mode is complete after the sensing stage.

In another example embodiment, a method of operating a cooktop appliance is provided. The cooktop appliance includes a user interface, a heating element positioned at a cooking surface of the cooktop appliance, and a temperature sensor configured to measure a temperature at a utensil heated by the heating element. The method includes receiving a rice cooking mode initiation signal. The method also includes operating the heating element to provide a first target temperature at the utensil during a preheat stage and measuring the temperature at the utensil during the preheat stage. The method further includes exiting the preheat stage when the measured temperature at the utensil reaches a temperature threshold. The method also includes operating the heating element to provide a second target temperature at the utensil during a simmer stage after the preheat stage. The second target temperature is less than the first target temperature. The method further includes operating the heating element to provide a third target temperature at the utensil during a sensing stage after the simmer stage and providing a user notification that the rice cooking mode is complete after the sensing stage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
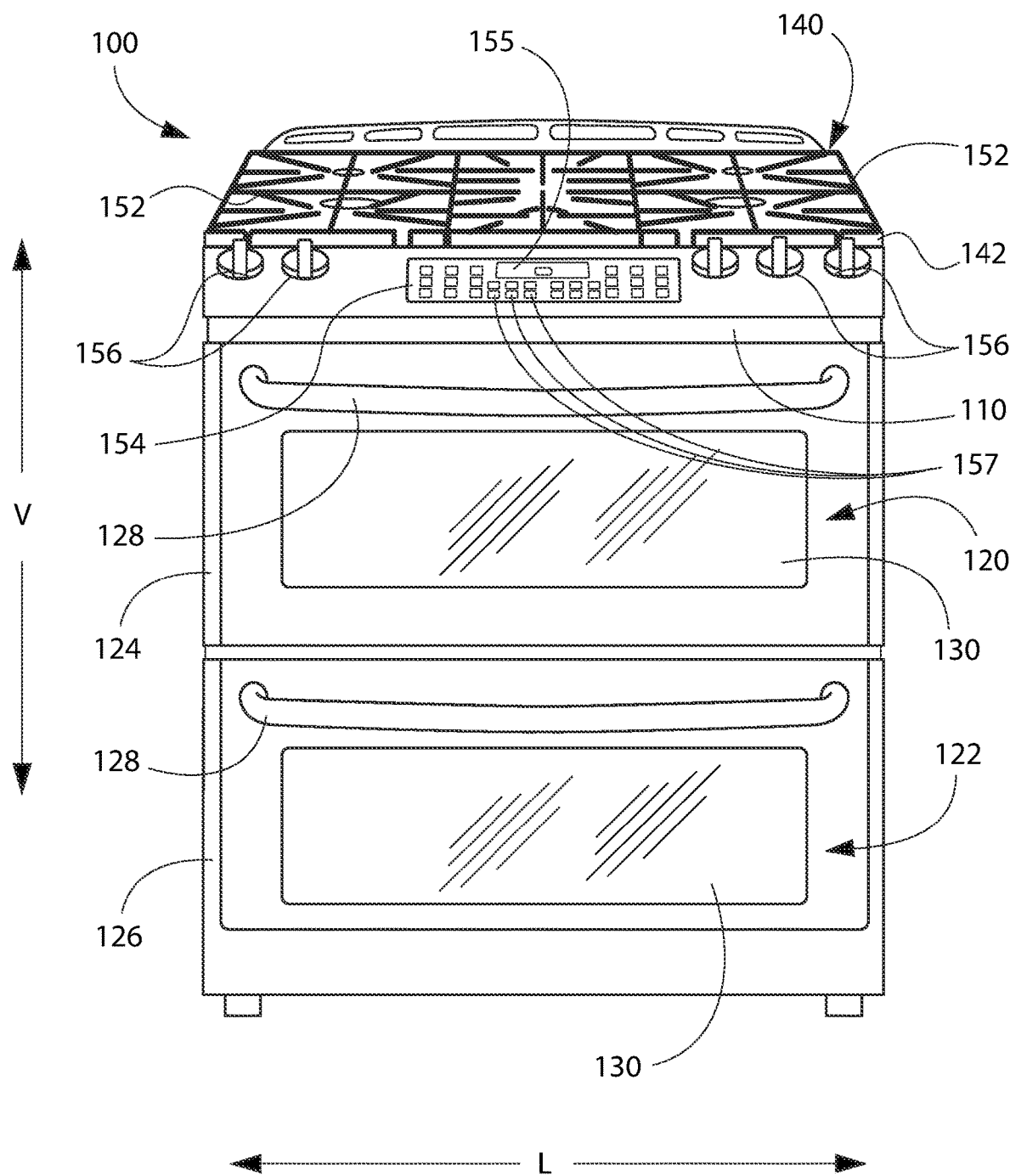
FIG. 1 provides a front, perspective view of a range appliance having a cooktop according to one or more example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

Figure 2:
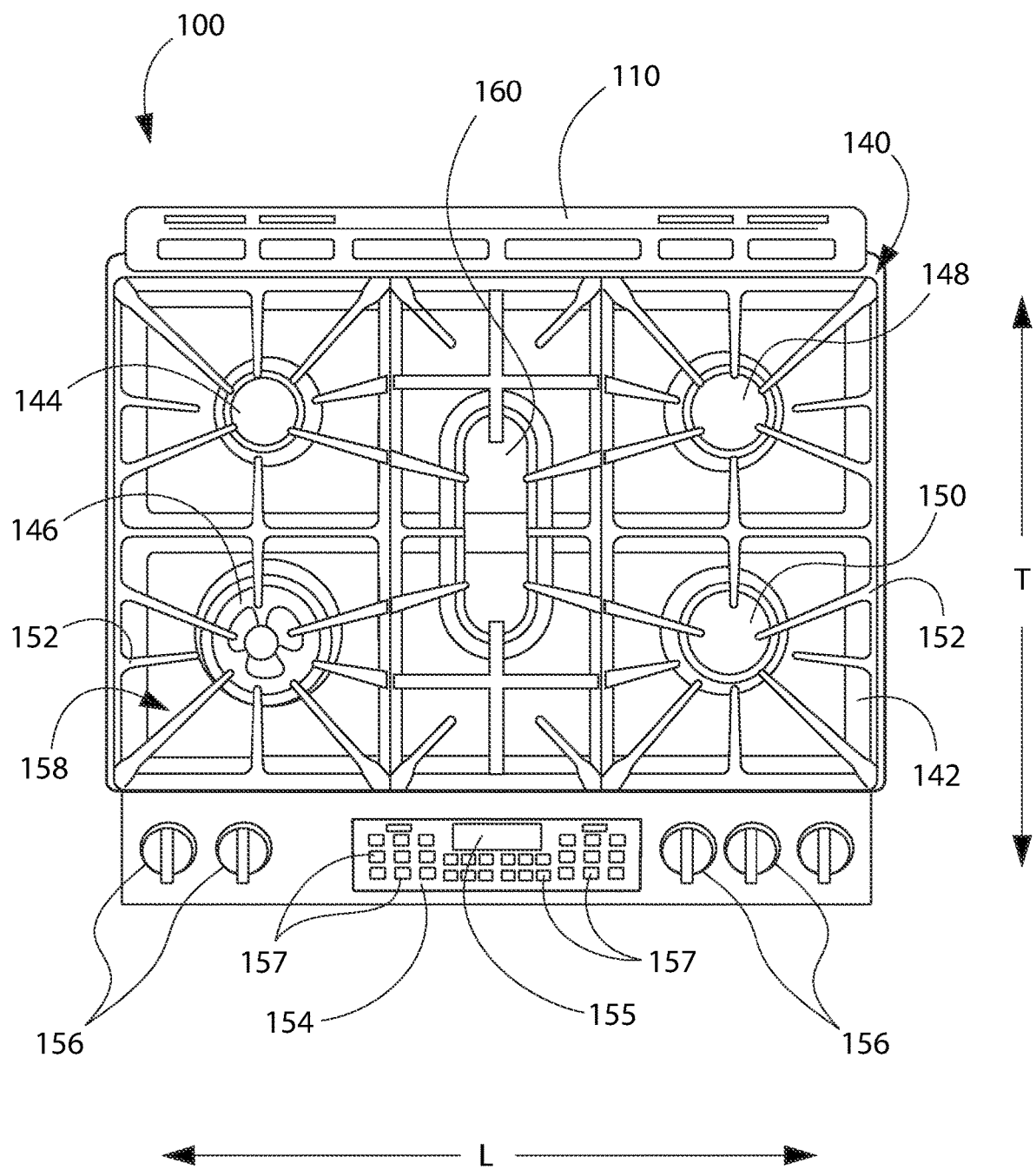
FIG. 2 provides a top, plan view of the example appliance of FIG. 1.

FIG. 1 provides a front, perspective view of a cooktop appliance 100 as may be employed with the present subject matter. FIG. 2 provides a top, plan view of cooktop appliance 100. As illustrated in FIGS. 1 and 2, the example cooktop appliance 100 includes an insulated cabinet 110. Cabinet 110 defines an upper cooking chamber 120 and a lower cooking chamber 122. Thus, this particular exemplary cooktop appliance 100 is generally referred to as a double oven range appliance. As will be understood by those skilled in the art, range appliance 100 is provided by way of example only, and the present subject matter may be used in any suitable cooktop appliance, e.g., a single oven range appliance or a standalone cooktop appliance. In other exemplary embodiments of the present disclosure, the cooktop appliance may include a single cooking chamber, or no cooking chamber at all, such as a standalone cooktop appliance, e.g., which may be built in to a countertop. Thus, the example embodiment shown in FIG. 1 is not intended to limit the present subject matter to any particular cooking chamber configuration or arrangement (or even the presence of a cooking chamber at all, e.g., as in the case of a standalone cooktop appliance).

Upper and lower cooking chambers 120 and 122 are configured for the receipt of one or more food items to be cooked. Cooktop appliance 100 includes an upper door 124 and a lower door 126 rotatably attached to cabinet 110 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Glass window panes 130 provide for viewing the contents of upper and lower cooking chambers 120 and 122 when doors 124 and 126 are closed and also assist with insulating upper and lower cooking chambers 120 and 122. Heating elements (not shown), such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

Cooktop appliance 100 also includes a cooktop 140. Cooktop 140 is positioned at or adjacent to a top portion of cabinet 110. Thus, cooktop 140 is positioned above upper and lower cooking chambers 120 and 122. Cooktop 140 includes a top panel 142. By way of example, top panel 142 may be constructed of glass, ceramics, stainless steel, enameled steel, and combinations thereof.

For cooktop appliance 100, a utensil 18 (see, e.g., FIGS. 3, 4, and 5) holding food and/or cooking liquids (e.g., oil, water, etc.) may be placed onto grates 152 at a location of any of burner assemblies 144, 146, 148, 150. Burner assemblies 144, 146, 148, 150 provide thermal energy to cooking utensils on grates 152. As shown in FIG. 2, burner assemblies 144, 146, 148, 150 can be configured in various sizes so as to provide e.g., for the receipt of cooking utensils (i.e., pots, pans, etc.) of various sizes and configurations and to provide different heat inputs for such cooking utensils. Grates 152 are supported on a cooking surface, e.g., top surface 158 of top panel 142. Range appliance 100 also includes a griddle burner 160 positioned at a middle portion of top panel 142, as may be seen in FIG. 2. A griddle may be positioned on grates 152 and heated with griddle burner 160.

A user interface panel 154 is located within convenient reach of a user of the range appliance 100. For this example embodiment, range appliance 100 also includes knobs 156 that are each associated with one of burner assemblies 144, 146, 148, 150 and griddle burner 160. Knobs 156 allow the user to activate each burner assembly and determine the amount of heat input provided by each burner assembly 144, 146, 148, 150 and griddle burner 160 to a cooking utensil located thereon. The user interface panel 154 may also include one or more inputs 157, such as buttons or a touch pad, for selecting or adjusting operation of the range appliance 100, such as for selecting or initiating a precision cooking mode, as will be described in more detail below. User interface panel 154 may also be provided with one or more graphical display devices 155 that deliver certain information to the user such as e.g., whether a particular burner assembly is activated and/or the temperature at which the burner assembly is set.

Although shown with knobs 156, it should be understood that knobs 156 and the configuration of range appliance 100 shown in FIG. 1 is provided by way of example only. More specifically, range appliance 100 may include various input components, such as one or more of a variety of touch-type controls, electrical, mechanical or electro-mechanical input devices including rotary dials, push buttons, and touch pads. The user interface panel 154 may include other display components, such as a digital or analog display device 155, designed to provide operational feedback to a user.

As will be discussed in greater detail below, the cooktop appliance 100 includes a control system 50 (FIG. 4) for controlling one or more of the plurality of heating elements 16. Specifically, the control system 50 may include a controller 52 (FIGS. 3, 4, and 5) operably connected to the user interface panel 154 and controls, e.g., knobs 156. The controller 52 may be operably connected to each of the plurality of heating elements 16 for controlling a power supply and/or flow of gaseous fuel to each of the plurality of heating elements 16 in response to one or more user inputs received through the interface panel 154 and controls.

Figure 3:
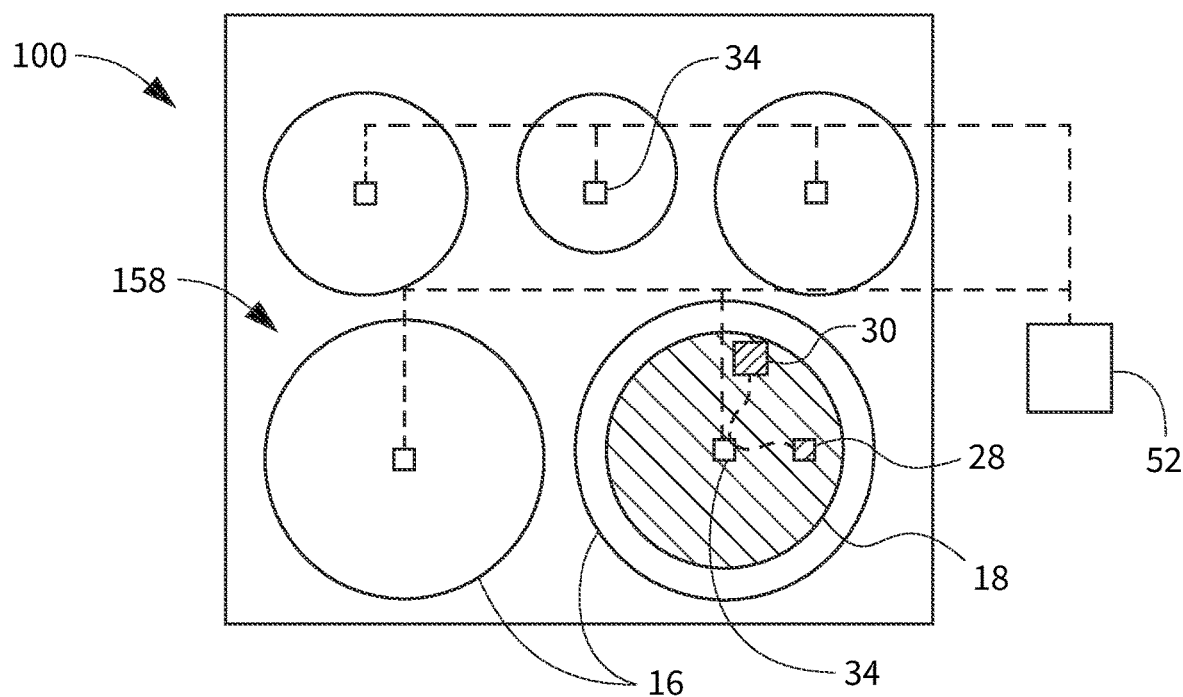
FIG. 3 is a schematic top view of an exemplary cooktop according to one or more example embodiments of the present subject matter which may be incorporated into a range appliance such as the range appliance of FIG. 1.

FIG. 3 is a schematic view of certain components of cooktop appliance 100. In particular, as shown in FIG. 3, cooktop appliance 100 includes a plurality of heating elements 16, which may be gas burners, e.g., as in the exemplary embodiments illustrated in FIGS. 1 and 2 and described above, or may be electric heating elements, such as induction heating elements or resistance heating elements.

Referring now to FIG. 3, a top, schematic view of a cooktop, which may be, e.g., the cooktop 140 of FIG. 1, is provided. As stated, the cooking surface 158 of the cooktop 140 for the embodiment depicted includes five heating elements 16 spaced along the cooking surface 158. The heating elements 16 may be gas burners, e.g., as illustrated in FIGS. 1 and 2, or may be electric heating elements such as resistance heating elements or induction heating elements, etc. A cooking utensil 18, also depicted schematically, is positioned on a first heating element 16 of the plurality of heating elements 16. As noted above, the cooking utensil 18 may be positioned above the cooking surface 158, e.g., on a grate 152, in embodiments where the heating element 16 is a gas burner. In other embodiments, e.g., where the heating element 16 is a radiant electric heating element or an induction heating element, the cooking utensil 18 may be positioned directly on the cooking surface 158.

Further, in embodiments where the heating element 16 is a coil electrical resistance heating element, the cooking utensil 18 may be positioned on the heating element 16. For the embodiment depicted in FIGS. 3 and 4, a cookware temperature sensor 28 and a food temperature sensor 30 are also associated with the cooking utensil 18. In additional embodiments, a temperature sensor may also be integrated into the cooktop, such as a pop-up sensor 40, as illustrated in FIG. 5 and described in further detail below.

In some example embodiments, the cookware temperature sensor 28 may be in contact with, attached to, or integrated into the cooking utensil 18 and configured to sense a temperature of, e.g., a bottom surface of the cooking utensil 18 or bottom wall of the cooking utensil 18. For example, the cookware temperature sensor 28 may be embedded within the bottom wall of the cooking utensil 18 as illustrated in FIG. 3. Alternatively, however, the cookware temperature sensor 28 may be attached to or integrated within the cooking surface 158 of the cooktop appliance 100. For example, the cookware temperature sensor 28 may be integrated into one or more of the heating elements 16, such as pop-up sensor 40 of FIG. 5. With such an exemplary embodiment, the cookware temperature sensor 28 may be configured to physically contact the bottom surface of a bottom wall of the cooking utensil 18 when the cooking utensil 18 is placed on the heating element 16 into which the temperature sensor 28 is integrated. Alternatively, cookware temperature sensor 28 may be positioned proximate to the bottom surface or bottom wall of the cooking utensil 18 when the cooking utensil 18 is placed on the heating element 16.

Additionally, the food temperature sensor 30 may be positioned at any suitable location to sense a temperature of one or more food items 32 (see FIG. 4) positioned within the cooking utensil 18. For example, the food temperature sensor may be a probe type temperature sensor configured to be inserted into one or more food items 32. Alternatively, however, the food temperature sensor 30 may be configured to determine a temperature of one or more food items positioned within the cooking utensil 18 in any other suitable manner.

In certain exemplary embodiments, one or both of the cookware temperature sensor 28 and the food temperature sensor 30 may utilize any suitable technology for sensing/determining a temperature of the cooking utensil 18 and/or food items 32 positioned in the cooking utensil 18. The cookware temperature sensor 28 and the food temperature sensor 30 may measure a respective temperature by contact and/or non-contact methods. For example, one or both of the cookware temperature sensor 28 and the food temperature sensor 30 may utilize one or more thermocouples, thermistors, optical temperature sensors, infrared temperature sensors, resistance temperature detectors (RTD), etc.

Referring again to FIGS. 3 and 4, the cooktop appliance 100 additionally includes at least one receiver 34. In the illustrated example of FIG. 3, the cooktop appliance 100 includes a plurality of receivers 34, each receiver 34 associated with an individual heating element 16. Each receiver 34 is configured to receive a signal from the food temperature sensor 30 indicative of a temperature of the one or more food items 32 positioned within the cooking utensil 18 and/or from the cookware temperature sensor 28 indicative of a temperature of the cooking utensil 18 positioned on a respective heating element 16. In other embodiments, a single receiver 34 may be provided and the single receiver 34 may be operatively connected to one or more of the sensors. In at least some exemplary embodiments, one or both of the cookware temperature sensor 28 and the food temperature sensor 30 may include wireless transmitting capabilities, or alternatively may be hard-wired to the receiver 34, e.g., through a wired communications bus.

Figure 4:
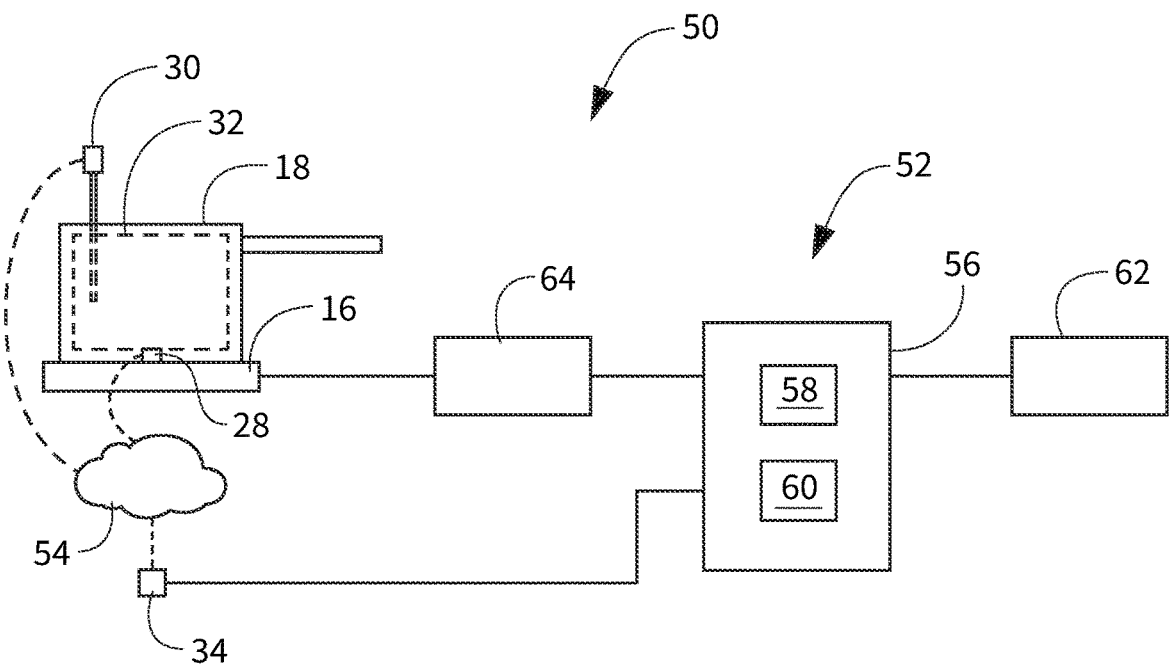
FIG. 4 provides a schematic diagram of a control system as may be used with the exemplary cooktop appliance of FIG. 3.
Figure 5:
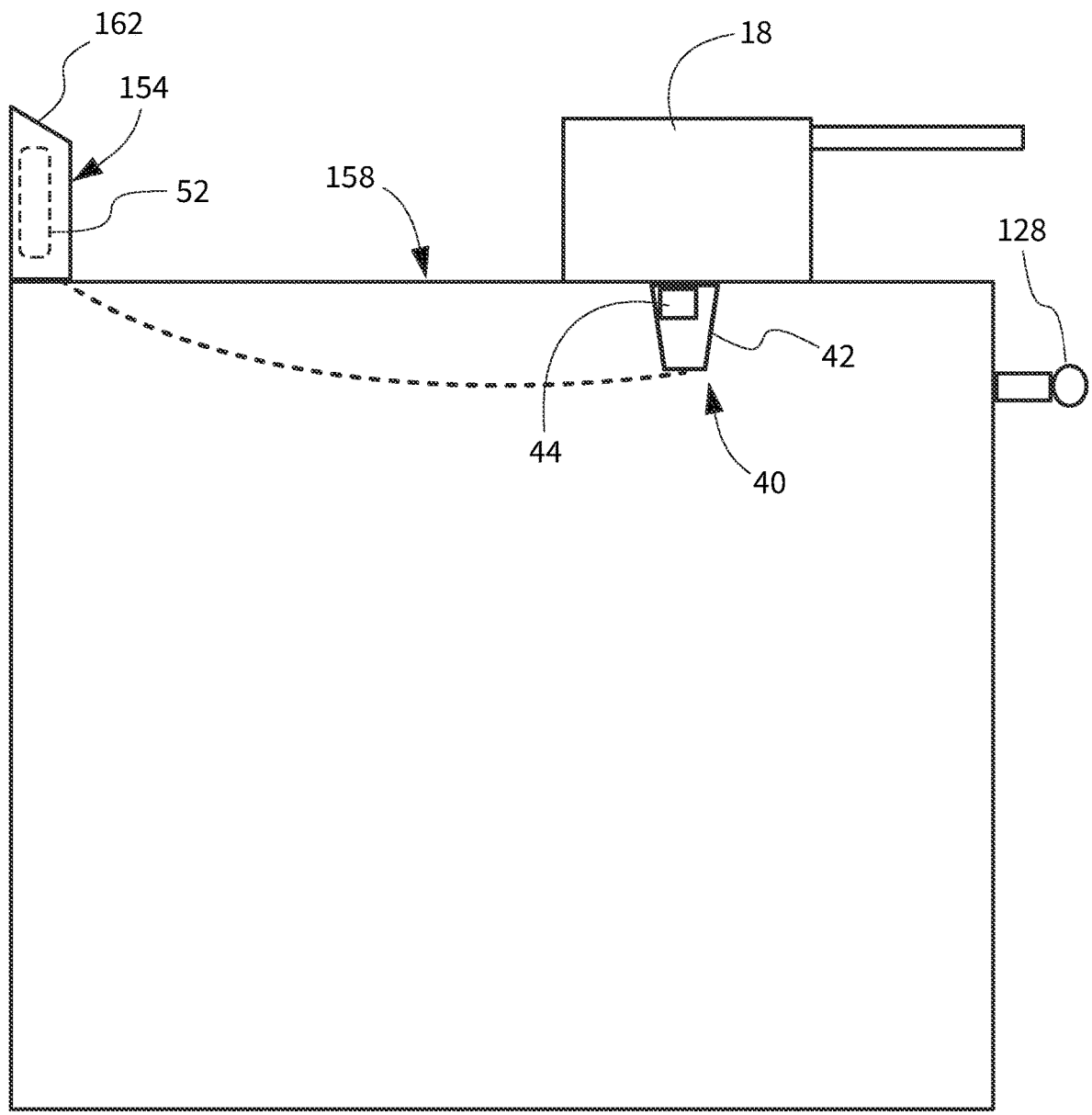
FIG. 5 provides a schematic diagram of an additional exemplary embodiment of a temperature sensor which may be incorporated into a cooktop appliance in accordance with one or more embodiments of the present subject matter.

FIG. 4 provides a schematic view of a system for operating a cooktop appliance 100 in accordance with an exemplary embodiment of the present disclosure. Specifically, FIG. 4 provides a schematic view of a heating element 16 of the exemplary cooktop appliance 12 of FIGS. 1 and 2 and an exemplary control system 50.

As stated, the cooktop appliance 100 includes a receiver 34 associated with one or more of the heating elements 16, for example a plurality of receivers 34 each associated with a respective heating element 16. For the embodiment depicted, each receiver 34 is positioned directly below a center portion of a respective heating element 16. Moreover, for the embodiment depicted, each receiver 34 is configured as a wireless receiver 34 configured to receive one or more wireless signals. Specifically, for the exemplary control system 50 depicted, both of the cookware temperature sensor 28 and the food temperature sensor 30 are configured as wireless sensors in wireless communication with the wireless receiver 34 via a wireless communications network 54. In certain exemplary embodiments, the wireless communications network 54 may be a wireless sensor network (such as a Bluetooth communication network), a wireless local area network (WLAN), a point-to point communication networks (such as radio frequency identification (RFID) networks, near field communications networks, etc.), a combination of two or more of the above communications networks, or any suitable wireless communications network or networks.

Referring still to FIG. 4, each receiver 34 associated with a respective heating element 16 is operably connected to a controller 52 of the control system 50. The receivers 34 may be operably connected to the controller 52 via a wired communication bus (as shown), or alternatively through a wireless communication network similar to the exemplary wireless communication network 54 discussed above. The controller 52 may generally include a computing device 56 having one or more processor(s) 58 and associated memory device(s) 60. The computing device 56 may be configured to perform a variety of computer-implemented functions to control the exemplary cooktop appliance 100. The computing device 56 can include a general purpose computer or a special purpose computer, or any other suitable computing device. It should be appreciated, that as used herein, the processor 58 may refer to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory 60 can store information accessible by processor(s) 58, including instructions that can be executed by processor(s) 58. For example, the instructions can be software or any set of instructions that when executed by the processor(s) 58, cause the processor(s) 58 to perform operations. For the embodiment depicted, the instructions may include a software package configured to operate the system to, e.g., execute the exemplary methods described below.

Referring again to FIG. 4, the control system 50 additionally includes a user interface 62 operably connected to the controller 52. For the embodiment depicted, e.g., in FIG. 4, the user interface 62 is configured in wired communication with the controller 52. However, in other exemplary embodiments, the user interface 62 may additionally or alternatively be wirelessly connected to the controller 52 via one or more suitable wireless communication networks (such as the exemplary wireless communication network 54 described above). In certain exemplary embodiments, user interface 62 may be configured as the user interface panel 154 and plurality of controls, e.g., knobs 156, on the cooktop appliance 100 (see, e.g., FIG. 1). Additionally, or alternatively, the user interface 62 may be configured as an external computing device or remote user interface device, such as a smart phone, tablet, or other device capable of connecting to the controller 52 of the exemplary control system 50. For example, in some embodiments, the remote user interface may be an application or "app" executed by a remote user interface device such as a smart phone or tablet. Signals generated in controller 52 operate the cooktop appliance 100 in response to user input via the user interface 62.

Further, the controller 52 is operably connected to each of the plurality of heating elements 16 for controlling an operating level, such as a supply of power or a flow of fuel, to each of the plurality of heating elements 16 in response to one or more user inputs through the user interface 62 (e.g., user interface panel 154 and/or controls, e.g., knobs 156). For example, the controller 52 may be operably connected to each of the plurality of heating elements 16 via a plurality of control devices 64, e.g., the controller 52 may be operably connected to the plurality of control devices 64, and each control device 64 may be associated with a respective one of the heating elements 16. In embodiments wherein one or more of the heating elements 16 are configured as electric resistance heaters, the controller 52 may be operably connected to respective relays, triodes for alternating current, or other devices for controlling an amount of power supplied to such electrical resistance heaters, each of which is an exemplary embodiment of control devices 64. Alternatively, in embodiments where one or more of the heating elements 16 are configured as induction heating elements, the controller 52 may be operably connected to respective current control devices, e.g., the control devices 64 operably connected to controller 52 may be respective current control devices for each induction heating element. As another example, in embodiments wherein one or more of the heating elements 16 are configured as gas burners, the control devices 64 may include one or more gas supply valves fluidly coupled to each gas burner for selectively adjusting or restricting, e.g., cutting off, a flow of fuel to each gas burner from a fuel supply.

In some embodiments, e.g., as illustrated in FIG. 5, the cooktop appliance 100 may include a backsplash 162. In such embodiments, the user interface panel 154 may be provided on the backsplash 162.

As mentioned above, in some embodiments a cookware temperature sensor may be attached to or integrated within the cooking surface 158 of the cooktop appliance 100, such as integrated into one or more of the heating elements 16. One example of such embodiments is illustrated in FIG. 5, where a pop-up temperature sensor 40 is integrated into an exemplary one heating element 16 (the heating element itself is not specifically illustrated in FIG. 5 to more clearly depict the pop-up sensor below the cooking surface 158. In particular, the pop-up sensor 40 includes a main body or housing 42 which is fixed in place below the cooking surface 158 and a movable contact temperature probe 44 which is movable, e.g., generally along the vertical direction V, between an extended position (not shown) and a retracted position, as illustrated in FIG. 5, when the probe 44 is in contact with a cooking utensil 18 placed on the cooking surface 158. For example, the pop-up sensor 40 may include a biasing element such as a spring positioned within the housing 42 and positioned between the housing 42 and the probe 44 to bias the probe 44 upwards, e.g., whereby the probe 44 pops up above the cooking surface 158 when a cooking utensil is not present and whereby the weight of a cooking utensil presses the probe downwards, e.g., to or towards the retracted position, when the cooking utensil is present. Thus, for example, the probe 44 of the pop-up temperature sensor 40 may be biased against the bottom outer surface of the cooking utensil 18 when the cooking utensil 18 is placed on or above the heating element 16, such as to promote contact between the probe 44 and the cooking utensil 18 for measurement of the temperature of the cooking utensil 18 by the probe 44.

As mentioned above, the temperature sensor or sensors may be communicatively coupled with the controller 52 by a wired or wireless connection. For example, in the illustrated embodiment of FIG. 5, the pop-up sensor 40 is coupled to the controller 52 by a wired connection. In such embodiments, the receiver 34 described above may be omitted. In additional embodiments, the pop-up sensor 40 of FIG. 5 may be in wireless communication with the controller 52, e.g., in a similar manner as described above with reference to FIGS. 3 and 4.

According to various embodiments of the present disclosure, the cooktop appliance 100 may be configured for a precision cooking mode and/or methods of operating the cooktop appliance 100 may include a precision cooking mode. In particular, as will be described in further detail below with reference to FIG. 6, the present subject matter may include an improved precision cooking mode that is specifically tailored for cooking rice, which may be referred to as a rice cooking mode. Precision cooking modes generally include a closed-loop control algorithm used to automatically (e.g., without user input such as adjusting the knobs 156) adjust the heating levels of one or more of the heating elements 16. Utilizing temperature measurements from one or more of the temperature sensors 28, 30, and/or 40, controller 52 may adjust the control device(s) 64 associated with the heating element 16 currently in use. For example, the user may turn on the closed loop control system by initiating precision cooking mode, such as by pressing or otherwise manipulating a corresponding one of the inputs or controls of the user interface 62. In some embodiments, such inputs and/or controls of the user interface 62 may also be used to input a user-defined set temperature or target temperature for the cooking operation. In particular, where the precision cooking mode is a rice cooking mode as described herein, the rice cooking mode may be initiated as described, and the inputs and/or controls may also be used to input or select a simmer time for a simmer stage of the rice cooking mode, or a rice attribute, wherein the rice cooking mode may include specific tailored values, e.g., time and/or temperature thresholds, for the selected rice attribute. For example, the selected rice attribute may be or include one or more of a rice type, a rice quantity or volume, or other possible selectable rice attributes.

When the closed loop control system is activated, controller 52 receives the temperature measurements from temperature sensor 28, 30, and/or 40 and compares the temperature measurements to a target temperature, e.g., the user-defined set temperature or a predetermined target temperature based on a current stage of the rice cooking mode and/or based on the selected rice attribute, e.g., type, quantity, volume, etc. In order to reduce a difference between the temperature measurements from the temperature sensor(s) and the target temperature, controller 52 adjusts the respective control device 64. Thus, the heat output provided by the heating element 16 may be regulated by the closed loop control system, e.g., without additional user input and/or monitoring.

A user may establish the set temperature, the simmer time, and/or select a rice attribute via the user interface 62, e.g., the user interface may include knobs 156, inputs 157, and a display 155, as in the illustrated example embodiment of FIG. 2. Controller 52 is in communication with user interface 62 and is configured to receive the user-determined set temperature from user interface 62. User interface 62 may correspond to user interface panel 154 and/or controls, e.g., knobs 156, in certain example embodiments. Thus, the user may, for example, utilize keys 157 on user interface panel 154 and/or a rotary position of one of the knobs 156 to establish the set temperature, the simmer time, and/or input the rice attribute. In at least some embodiments the rice cooking mode does not require or include a user-selected temperature but instead is fully automated and is performed continuously from start to finish in response to only the rice cooking mode initiation command, or only the rice attribute selection and the rice cooking mode initiation command, or only the simmer time input and the rice cooking mode initiation command.

In some example embodiments, user interface 62 is positioned on top panel 142 and may be in communication with controller 52 via a wiring harness. As another example, user interface 62 may also or instead correspond to an application on a smartphone or other device, and the user may utilize the application, e.g., to establish the set temperature, to input the simmer time, or to select the rice attribute. In such example embodiments, user interface 62 may be in wireless communication with controller 52, e.g., via a Bluetooth® or Wi-Fi® connection.

Figure 6:
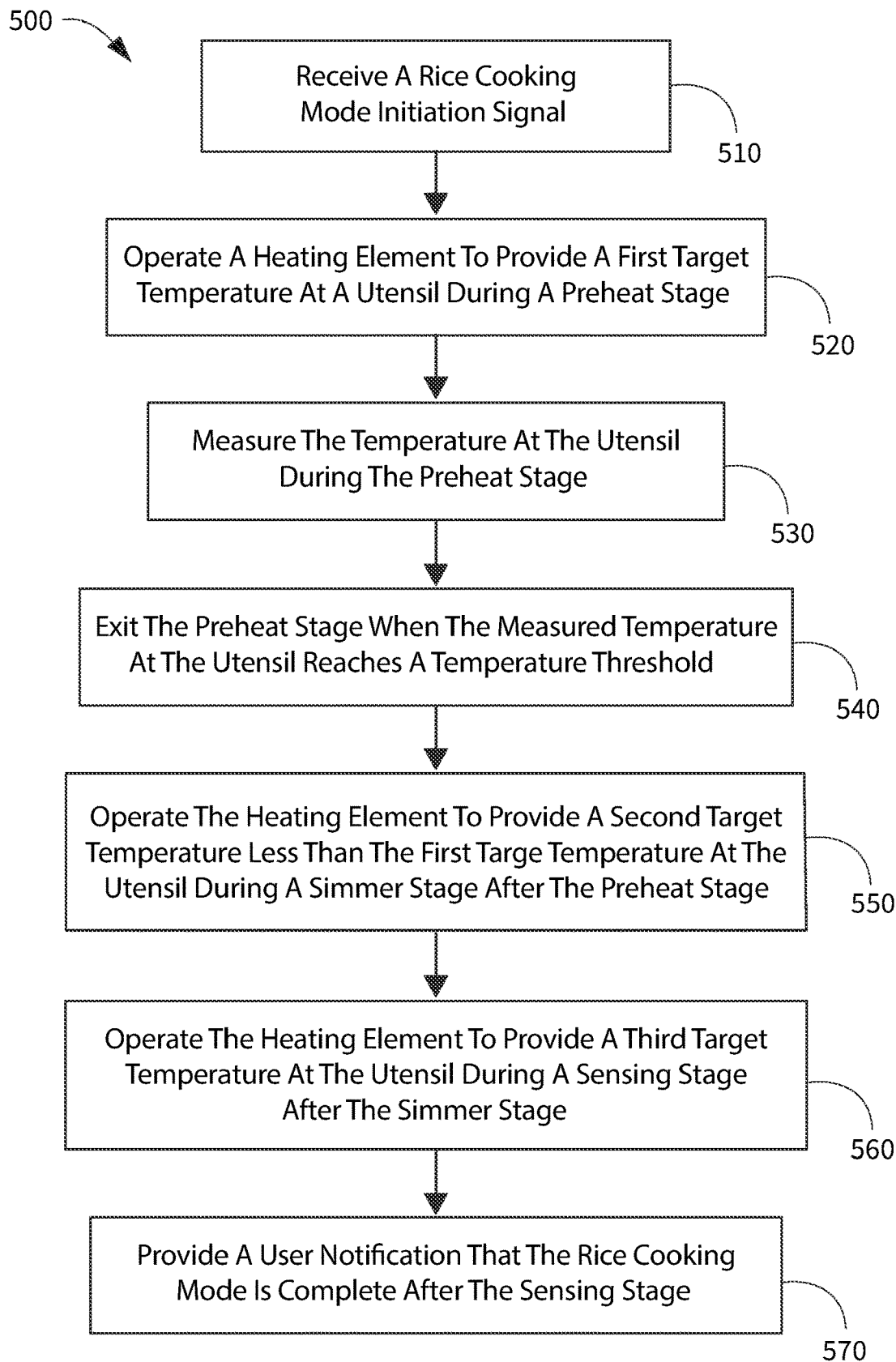
FIG. 6 provides a flow chart illustrating an exemplary method of operating a cooktop appliance according to one or more example embodiments of the present subject matter.

Turning now to FIG. 6, an example method 500 of operating a cooktop appliance, such as the example appliance 100 described above, is illustrated. Thus, the cooktop appliance which is operated according to the exemplary method 500 may include a user interface, a heating element positioned at a cooking surface of the cooktop appliance, and a temperature sensor configured to measure a temperature at a utensil heated by the heating element. The method 500 may include a step 510 of receiving a rice cooking mode initiation signal, e.g., from a user interface, such as user interface 62, of the cooktop appliance.

As mentioned above, the rice cooking mode may be a precision cooking mode which is particularly suited for cooking rice, e.g., according to one or more of the further exemplary steps described hereinbelow, such as multiple stages of the rice cooking mode which use time and temperature input from the temperature sensor to transition from one stage to the next, and the stages may be designed, e.g., based on the time and/or temperature limits, to prevent boil overs and overcooking of the rice while yielding consistent cooking results. For example, the rice cooking mode may generally include a preheat stage, a simmer stage, a sensing stage, and a keep warm stage. Continuing the example, during the preheat stage the sensor target temperature may be set to a high value in order to quickly reach a boil, while in the simmer stage, the sensor target temperature may be set to a lower level in order to provide simmer cooking of the rice while minimizing or avoiding boil overs. Still referring to the same example, the sensing stage may include setting the target temperature to a higher value than the simmer stage target temperature, such as in order to quickly boil off any remaining water, and the water boiling off may be detected based on a rapid temperature increase detected by the temperature sensor. The keep warm stage of the exemplary rice cooking mode may include lowering the target temperature to a food-safe temperature until the rice cooking mode is terminated, which may be automatic, e.g., after a predetermined keep warm time, or manual, e.g., in response to a user input such as turning off the rice cooking mode.

The rice cooking mode initiation signal may be received from the user interface, e.g., user interface panel 154 and/or knobs 156. The rice cooking mode initiation signal may represent or correspond to a user request for the rice cooking mode based on a user pressing a rice cooking mode key or button 157 or otherwise entering the request via the user interface 62. It will be understood that the rice cooking mode includes at least one target temperature during one or more stages of the rice cooking mode, e.g., the target temperature may be a predetermined target temperature that is stored in a memory of a controller of the cooktop appliance and/or in a memory of a remote computing device that is in communication, such as over the internet or in a distributed computing environment (e.g., cloud), with the controller of the cooktop appliance. In some exemplary embodiments, the rice cooking mode initiation signal may include or be accompanied by a rice attribute selection and the simmer time may be retrieved or selected such as by looking up the selected rice attribute in a lookup table and selecting the simmer time associated with the selected rice attribute in the lookup table. The rice cooking mode may utilize a closed-loop control system in at least one stage of the rice cooking mode, where the closed-loop control system may operate or adjust the cooktop appliance, e.g., power levels of one or more heating elements of the cooking appliance, based on input from a temperature sensor.

As illustrated in FIG. 6, exemplary embodiments of the method 500 may also include a step 520 of operating the heating element to provide a first target temperature at the utensil during a preheat stage. During the preheat stage, the method 500 may also include measuring, e.g., with the temperature sensor, the temperature at the utensil heated by the heating element, as indicated at 530 in FIG. 6. Method 500 may further include exiting the preheat stage when the measured temperature at the utensil reaches a temperature threshold, e.g., as shown at 540 in FIG. 6.

In some embodiments, operating the heating element to provide the first target temperature at the utensil during the preheat stage may include determining a power level of the heating element using a closed-loop control algorithm based on the first target temperature setpoint and on the measured temperature at the utensil. As mentioned above, the heating element, e.g., heating element 16, may be any suitable type of heating element. For example, in some embodiments, the heating element may be or include a gas burner. In such embodiments, the power level of the heating element, e.g., which may be determined by the closed-loop control algorithm, may correspond to a position of a fuel supply valve coupled to the gas burner. As another example, in additional embodiments, the heating element may also or instead be or include an electric heating element. In such embodiments, the power level of the heating level may correspond to a level of electric power supplied to the heating element. In some embodiments, the closed-loop control algorithm may include or be set to an elevated target temperature during the preheat stage, e.g., the target temperature during the preheat stage may be greater than a desired actual temperature or temperature threshold, such as the temperature threshold at which the method exits the preheat stage. Thus, the elevated target temperature may permit the closed-loop control to bring the temperature to the threshold more quickly, e.g., as compared to setting the target temperature to the threshold, and thereby shorten the time duration of the preheat stage. For example, the target temperature may be set to between about 300° F. and about 400° F., such as between about 320° F. and about 380° F., such as about 335° F. or about 350° F., and the threshold temperature may be between about 110° F. and about 250° F., such as between about 145° F. and about 215° F., such as about 180° F.

In some embodiments, operating the heating element to provide the first target temperature at the utensil during the preheat stage may include operating the heating element at a fixed power level.

Still referring to FIG. 6, method 500 may also include a step 550 of operating the heating element to provide a second target temperature at the utensil during a simmer stage after the preheat stage. The second target temperature during the simmer stage may be different from, e.g., less than, the first target temperature from the preheat stage. For example, where the elevated target temperature during the preheat stage may advantageously provide an expedited preheat stage, a lower second target temperature during the simmer stage may advantageously prevent or reduce boiling over or over-cooking the rice. In some embodiments, the second target temperature may be between about 130° F. and about 280° F., such as between about 175° F. and about 250° F., such as about 200° F. or about 210° F.

The simmer stage may be time-based and/or temperature based. For example, in some embodiments, method 500 may include exiting the simmer stage when a simmer time elapses. As mentioned above, the simmer time may be received from a user input device of the user interface of the cooktop appliance, or may be retrieved from a lookup table in a memory of the controller of the cooktop appliance or a memory of a remote computing device based on a rice attribute input. Also, in some embodiments, the simmer time may be a default simmer time or generic rice simmer time, e.g., when no simmer time input or rice attribute input is provided. In embodiments where the generic rice simmer time is used, the target temperature during the simmer stage may be lower than the target temperature during other simmer stages, e.g., to reduce or avoid boil-overs during the generic rice simmer time.

As may also be seen in FIG. 6, method 500 may further include a step 560 of operating the heating element to provide a third target temperature at the utensil during a sensing stage after the simmer stage. In some embodiments, the third target temperature may be greater than the second target temperature.

In other embodiments, the third target temperature may be equal to the second target temperature. For example, in embodiments where the rice cooking mode is performed automatically in response to only the rice cooking mode initiation signal, e.g., when a simmer time input or rice attribute input is not provided, the simmer stage and the sensing stage may be combined, e.g., the target temperature during both stages may be the same, such as the third target temperature may be equal to the second target temperature.

In some embodiments, the third target temperature may be between about 150° F. and about 300° F., such as between about 180° F. and about 260° F., such as about 215° F. or about 230° F. The sensing stage may be time-based and/or temperature based. For example, the sensing stage may be ended based on a temperature threshold or a rate of change of the sensed temperature. In some embodiments, the method 500 may also include measuring the temperature at the utensil over time during the sensing stage. Such embodiments may further include exiting the sensing stage when a rate of temperature rise, e.g., an increase in the measured temperature over time, reaches a threshold temperature slope. For example, the threshold temperature slope may indicate or correspond to a rate of increase of the temperature measured at the utensil heated by the heating element when all or substantially all of the remaining water in the utensil has evaporated or been absorbed by the rice, such that the total thermal mass of the items in the utensil has decreased due to the decrease in liquid water present in the utensil, thereby allowing the temperature to rise more quickly, e.g., as compared to when the heating element is operating at or about the same power level but the thermal mass is greater due to the presence of liquid water in the utensil. In some embodiments, the threshold temperature slope may correspond to a temperature rise of at least about 5° F., such as about 7.5° F. or more, such as about 10° F. or more, such as about 15° F., over a time span of about two minutes or less, such as about one and a half minutes or less, such as about one minute.

Still referring to FIG. 6, method 500 may also include a step 570 of providing a user notification that the rice cooking mode is complete. For example, in some embodiments the user notification may be provided after the sensing stage. For example, the user notification may be provided immediately after the sensing stage, or may also or instead be provided after a keep warm stage which follows the sensing stage. In additional embodiments, the user notification may be provided just before the end of the sensing stage or just before the end of the keep warm stage. In further embodiments, the user notification may also or instead be provided at the same time as the sensing stage ends or the same time as the end of the keep warm stage. The user notification may be provided using one or more of a user interface on the cooktop appliance and/or a remote user interface device. In exemplary embodiments where the user notification is also or instead provided on the remote user interface device, the remote user interface device may be any suitable device such as a laptop computer, smartphone, tablet, personal computer, wearable device, smart speaker, smart home system, and/or various other suitable devices. The remote user interface device is "remote" at least in that it is spaced apart from and not physically connected to the cooktop appliance, e.g., the remote user interface device is a separate, stand-alone device from the cooktop appliance which communicates with the cooktop appliance wirelessly, e.g., through various possible communication connections and interfaces such as WI-FI®. The cooktop appliance and the remote user interface device may be matched in wireless communication, e.g., connected to the same wireless network. The cooktop appliance may communicate with the remote user interface device via short-range radio such as BLUETOOTH® or any other suitable wireless network having a layer protocol architecture. Any suitable device separate from the cooktop appliance that is configured to provide and/or receive communications, information, data, or commands from a user may serve as the remote user interface device, such as a smartphone, smart watch, personal computer, smart home system, or other similar device. For example, the remote user interface device may be a smartphone operable to store and run applications, also known as "apps," and some or all of the method steps disclosed herein may be performed by a smartphone app. For example, the user notification may be or include an email, a text message, and/or other suitable notifications via a remote user interface device.

In some embodiments, the method 500 may further include a keep warm stage after the sensing stage, and, in such embodiments, the user notification may be provided after the keep warm stage. For example, in embodiments where the keep warm stage is included, method 500 may include operating the heating element to provide a fourth target temperature at the utensil during a keep warm stage after the sensing stage. In such embodiments, the fourth target temperature may be less than the third target temperature.

The rice cooking mode may be completely automated. For example, the preheat stage, the simmer stage, and the sensing stage may be performed continuously and successively after receiving the rice cooking mode initiation signal. As another example, the entire rice cooking mode may be performed in response to a single or otherwise limited user input, such as without any additional user inputs after the rice cooking mode has been initiated, e.g., the preheat stage, the simmer stage, and the sensing stage may be performed after receiving the rice cooking mode initiation signal without any additional user input during the preheat stage, during the simmer stage, during the sensing stage, between the preheat stage and the simmer stage, or between the simmer stage and the sensing stage. Additionally, in embodiments where the keep warm stage is included, the rice cooking mode may also include performing the keep warm stage in response to the single or otherwise limited user input, such as continuously and successively with the other stages as mentioned above, such as without any additional user inputs between the sensing stage and the keep warm stage or during the keep warm stage. For example, the rice cooking mode may be automatic in that the end of each stage and transition to a next subsequent stage are determined without any further user input indicating the end of the stage. The end of each stage may be determined, e.g., detected, using one or more of temperature, time, call for heating, slope of the call for heating, and/or slope of the temperature. For example, the end of a stage may be determined based on temperature when a temperature measured by the temperature sensor at the utensil heated by the heating element reaches a threshold. As another example, the end of a stage may be determined based on call for heating when a called-for power level that is an output of the closed-loop control algorithm reaches a certain level, e.g., a certain percentage of the total power or maximum power capacity of the heating element.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:
    a user interface;
    a heating element positioned at a cooking surface of the cooktop appliance, wherein the cooking surface is a top external surface of the cooking appliance;
    a temperature sensor integrated into the heating element, the temperature sensor configured to measure a temperature at a utensil heated by the heating element, wherein the utensil is separate from the cooktop appliance; and
    a controller in communication with the temperature sensor, the controller configured for:
        receiving a rice cooking mode initiation signal, wherein the rice cooking mode is one of a plurality of precision cooking modes of the cooktop appliance;
        receiving a rice attribute selection via the user interface, wherein the rice cooking mode comprises a plurality of specific tailored values for the selected rice attribute;
        operating the heating element to provide a first target temperature at the utensil during a preheat stage, wherein the first target temperature is one of the plurality of specific tailored values for the selected rice attribute;
        measuring the temperature at the utensil heated by the heating element during the preheat stage;
        exiting the preheat stage when the measured temperature at the utensil reaches a temperature threshold, wherein the temperature threshold is one of the plurality of specific tailored values for the selected rice attribute;
        operating the heating element to provide a second target temperature at the utensil during a simmer stage after the preheat stage, wherein the second target temperature is different from the first target temperature, wherein the second target temperature is one of the plurality of specific tailored values for the selected rice attribute;
        operating the heating element to provide a third target temperature at the utensil during a sensing stage after the simmer stage, wherein the third target temperature is one of the plurality of specific tailored values for the selected rice attribute; and
        providing a user notification that the rice cooking mode is complete.

2. The cooktop appliance of claim 1, wherein operating the heating element to provide the first target temperature at the utensil during the preheat stage comprises determining a power level of the heating element using a closed-loop control algorithm based on the first target temperature and on the measured temperature at the utensil.

3. The cooktop appliance of claim 1, wherein operating the heating element to provide the first target temperature at the utensil during the preheat stage comprises operating the heating element at a fixed power level.

4. The cooktop appliance of claim 1, wherein the controller is configured for exiting the simmer stage when a simmer time elapses.

5. The cooktop appliance of claim 1, wherein the controller is further configured for measuring the temperature at the utensil over time during the sensing stage and for exiting the sensing stage when a rate of temperature rise reaches a threshold temperature slope.

6. The cooktop appliance of claim 1, wherein the preheat stage, the simmer stage, and the sensing stage are performed continuously and successively after receiving the rice cooking mode initiation signal.

7. The cooktop appliance of claim 1, wherein the preheat stage, the simmer stage, and the sensing stage are performed after receiving the rice cooking mode initiation signal without any additional user input during or between the preheat stage, the simmer stage, and the sensing stage.

8. The cooktop appliance of claim 1, wherein the controller is further configured for operating the heating element to provide a fourth target temperature at the utensil during a keep warm stage after the sensing stage, wherein the fourth target temperature is less than the third target temperature.

9. The cooktop appliance of claim 1, wherein the third target temperature is greater than the second target temperature.

10. The cooktop appliance of claim 1, wherein the third target temperature is equal to the second target temperature.

11. A method of operating a cooktop appliance, the cooktop appliance comprising a user interface, a heating element positioned at a cooking surface of the cooktop appliance, wherein the cooking surface is a top external surface of the cooking appliance, a temperature sensor integrated into the heating element, the temperature sensor configured to measure a temperature at a utensil heated by the heating element, wherein the utensil is separate from the cooktop appliance, and a controller in communication with the temperature sensor, the method comprising:

receiving a rice cooking mode initiation signal, wherein the rice cooking mode is one of a plurality of precision cooking modes of the cooktop appliance;

receiving a rice attribute selection via the user interface, wherein the rice cooking mode comprises a plurality of specific tailored values for the selected rice attribute;

operating the heating element to provide a first target temperature at the utensil during a preheat stage, wherein the first target temperature is one of the plurality of specific tailored values for the selected rice attribute;

measuring the temperature at the utensil heated by the heating element during the preheat stage;

exiting the preheat stage when the measured temperature at the utensil reaches a temperature threshold, wherein the temperature threshold is one of the plurality of specific tailored values for the selected rice attribute;

operating the heating element to provide a second target temperature at the utensil during a simmer stage after the preheat stage, wherein the second target temperature is different from the first target temperature, wherein the second target temperature is one of the plurality of specific tailored values for the selected rice attribute;

operating the heating element to provide a third target temperature at the utensil during a sensing stage after the simmer stage, wherein the third target temperature is one of the plurality of specific tailored values for the selected rice attribute; and providing a user notification that the rice cooking mode is complete.

12. The method of claim 11, wherein operating the heating element to provide the first target temperature at the utensil during the preheat stage comprises determining a power level of the heating element using a closed-loop control algorithm based on the first target temperature and on the measured temperature at the utensil.

13. The method of claim 11, wherein operating the heating element to provide the first target temperature at the utensil during the preheat stage comprises operating the heating element at a fixed power level.

14. The method of claim 11, further comprising exiting the simmer stage when a simmer time elapses.

15. The method of claim 11, further comprising measuring the temperature at the utensil over time during the sensing stage and exiting the sensing stage when a rate of temperature rise reaches a threshold temperature slope.

16. The method of claim 11, wherein the preheat stage, the simmer stage, and the sensing stage are performed continuously and successively after receiving the rice cooking mode initiation signal.

17. The method of claim 11, wherein the preheat stage, the simmer stage, and the sensing stage are performed after receiving the rice cooking mode initiation signal without any additional user input during or between the preheat stage, the simmer stage, and the sensing stage.

18. The method of claim 11, further comprising operating the heating element to provide a fourth target temperature at the utensil during a keep warm stage after the sensing stage, wherein the fourth target temperature is less than the third target temperature.

19. The method of claim 11, wherein the third target temperature is greater than the second target temperature.

20. The method of claim 11, wherein the third target temperature is equal to the second target temperature.

* * * * *